United States Patent [19]

Yahata et al.

[11] 4,159,527
[45] Jun. 26, 1979

[54] WAVE GENERATOR

[75] Inventors: Haruki Yahata; Shunsuke Honda, both of Yokohama; Tadamichi Kawasaki, Kawasaki, all of Japan

[73] Assignee: Tokyo Shibaura Electric Co., Ltd., Kawasaki, Japan

[21] Appl. No.: 870,647

[22] Filed: Jan. 19, 1978

[51] Int. Cl.² .................. G06F 15/34; H03B 3/08
[52] U.S. Cl. .................. 364/721; 324/83 R; 328/14; 328/155
[58] Field of Search ........ 364/721; 324/83 R, 83 D, 324/83 FE; 307/232; 328/14, 155

[56] References Cited

U.S. PATENT DOCUMENTS

| | | | |
|---|---|---|---|
| 3,898,446 | 8/1975 | Vatz | 364/721 X |
| 3,898,579 | 8/1975 | Aldridge | 324/14 X |
| 3,973,209 | 8/1976 | Nossen et al. | 364/721 X |
| 4,037,171 | 7/1977 | Cordell | 324/83 R X |

*Primary Examiner*—Jerry Smith
*Attorney, Agent, or Firm*—Oblon, Fisher, Spivak, McClelland & Maier

[57] ABSTRACT

A periodic function wave generator is provided in a digital phase synchronizing circuit which comprises a memory circuit for storing the values of n phases obtained by equally dividing one period of a sine wave by 4n and each having a phase $\theta = 90°/n(i+0.5)$, where n represents an integer and i is an integer of from 0 to n−1, a circuit for designating a predetermined one of these phases in one period, a circuit for converting an address read out of the memory circuit into one of the n phases in accordance with one of the ranges of 0° to 90°, 90° to 180°, 180° to 270° and 270° to 360° and a circuit for inverting the sign of the output of the memory circuit in accordance with the particular range in which the designated phase falls.

8 Claims, 13 Drawing Figures

F I G. 6A
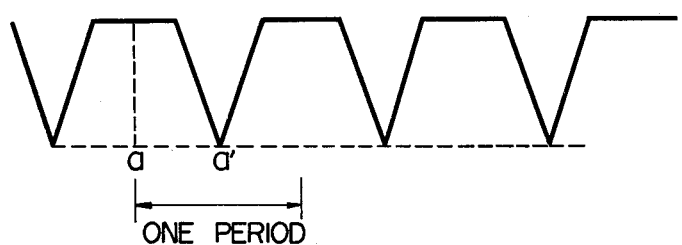
ONE PERIOD
F I G. 6B
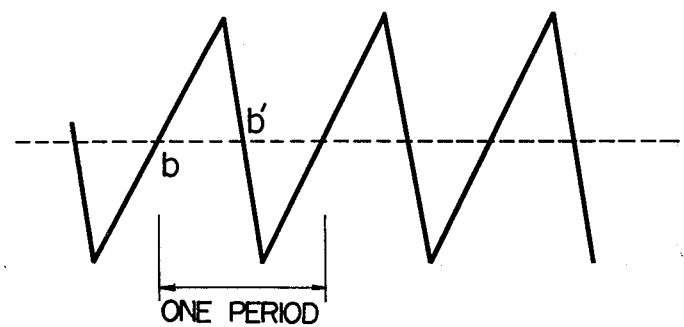
ONE PERIOD
F I G. 7
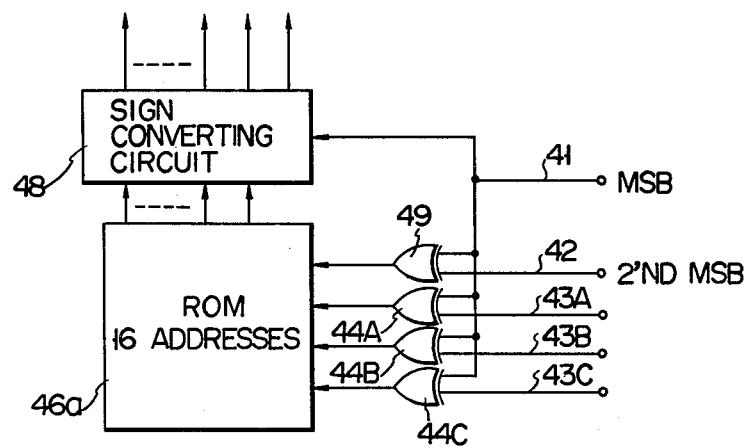

WAVE GENERATOR

BACKGROUND OF THE INVENTION

This invention relates to a wave generator for generating a periodic function wave signal for use with a digital circuit, such as a phase lock loop, a Costas loop and the like.

With the recent advances in digital techniques, a wave generator used in, for example, a phase synchronizing circuit which had previously been fabricated with an analogue circuit may now be fabricated using digitized LSI. With such a digitized phase synchronizing circuit, there is produced a sampled sine wave train y(n), for example, which is phase synchronized with a sampled input train x(n). It is necessary to use a read only memory device (ROM) for generating the value of a sine wave having a phase designated in the circuit. In the case where the number of phase designations in one period of the sine wave is small the output extracted by the phase synchronizing circuit contains a large jitter component which is of course undesirable. On the other hand, when the number of phase designations is increased for the purpose of preventing jitter, it is necessary to increase the capacity of ROM, thus making it difficult to fabricate with an LSI.

SUMMARY OF THE INVENTION

Accordingly, it is an object of this invention to provide an improved wave generator used in, for example, a digital phase synchronizing circuit that can decrease the required capacity of the ROM to about ½ or ¼ of the prior art generator without increasing jitter.

Another object of this invention is to provide a novel wave generator capable of decreasing the required capacity of the ROM by one bit for each address of the ROM without increasing quantizing error and capable of decreasing the number of operations of the related circuits by one bit operation.

According to one aspect of this invention there is provided a wave generator comprising means for designating a predetermined phase in one period of a periodic function signal, a circuit for producing a periodic function value of said designated phase, means for utilizing the output of said producing circuit to control said phase designating means, a memory circuit for storing the values of n phases of a periodic function obtained by equally dividing one period of said by 4n, each periodic function having a phase $\theta = 90°/n(i+0.5)$, where n represents an integer, and i represents an integer of 0 to n-1, circuit means for converting an address read out of said memory circuit into one of said n phases in accordance with one of the ranges of 0°–90°, 90°–180°, 180°–270°, and 270°–360° in which said designated phase falls, and a circuit for inverting the sign of the output of said producing circuit in accordance with the particular range in which said designated phase falls.

According to another aspect of this invention there is provided a digital phase synchronizing circuit comprising means for designating a predetermined phase in one period of a periodic function signal, a circuit for producing a periodic function value of the designated phase, a multiplying circuit for multiplying the periodic function value with an input from outside, means for utilizing the output of the multiplying circuit to control the phase designating means, a memory circuit for storing the values of n phases of a periodic function obtained by equally dividing one period of the by 4n, each periodic function having a phase of $\theta = 90°/n(i+0.5)$ where n represents an integer, and i represents an integer of 0 to n-1 circuit means for converting an address read out of the memory circuit into one of the n phases in accordance with one of the ranges of 0° to 90°, 90° to 180°, 180° to 270° and 270° to 360° in which the designated phase falls and a circuit for inverting the sign of the output of the multiplying circuit in accordance with the particular range in which the designated phase falls.

BRIEF DESCRIPTION OF THE DRAWINGS

Further objects and advantages of the invention can be more fully understood from the following detailed description taken in conjunction with the accompanying drawings in which:

FIGS. 5A, 5B, 6A and 6B are waveforms respectively showing examples of a periodic function;

FIG. 7 is a block diagram showing a modified embodiment of this invention wherein the periodic function has an odd symmetrical waveform;

DESCRIPTION OF THE PREFERRED EMBODIMENTS

Figure 1:
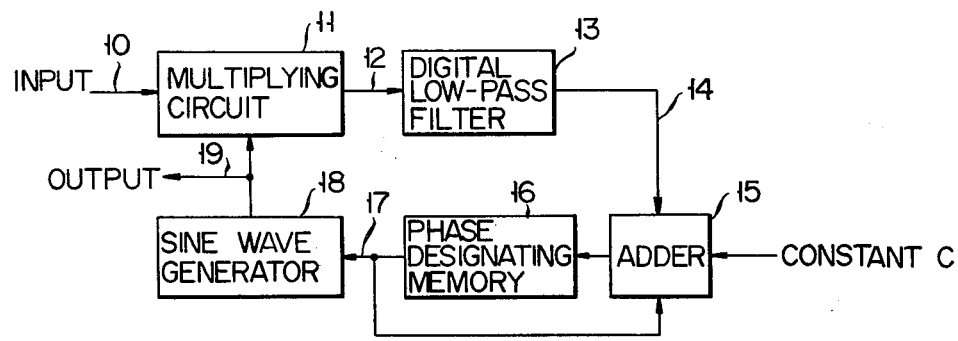
FIG. 1 is a block diagram showing the circuit construction of a digital phase lock loop.

In this specification, the embodiment of this invention is directed to a digital phase synchronizing, but the wave generator of this invention may be applied to any digital circuit.

Before describing the invention, the circuit construction of a digital phase lock circuit will firstly be described with reference to FIG. 1 which comprises an input 10 for receiving a sampled train x(n), an output 19 for producing a train y(n) consisting of a sampled sine wave, and a multiplying circuit 11 which acts as a phase comparator.

Where $$x(n) = \sin(\omega_c nT + \theta)$$

and $$y(n) = \cos(\omega_c nT)$$

are used with the sampling interval T, the train Z(n) of the output 12 produced by the multiplying circuit 11 is expressed by the following equation:

$$Z(n) = x(n) \cdot y(n) = \sin(\omega_c nT + \theta)\cos(\omega_c nT)$$

$$= \frac{1}{2}\{\sin(2\omega_c nT + \theta) + \sin\theta\} \quad (1)$$

A digital low pass filter 13 is connected to the output 12 of the multiplying circuit 11 to decrease signal components having frequencies twice that of the carrier wave shown in equation (1) and to determine the characteristic of the circuit. The filter may have a simple construction having a transfer function H(z) expressed by the following equation:

$$H(z) = K_2/(1 - K_1 Z^{-1})$$

where $K_1$ and $K_2$ are constant and $Z^{-1}$ represents one sample delay. Under these conditions the output w(n) of the filter contains a small amount of component $2\omega_c$. An adder 15, a phase designating memory device 16 and a sine wave generator 18 cooperate to constitute a digital voltage controlled oscillator. The sine wave generator 18 is constructed to produce a sine wave having an amplitude corresponding to a phase 17 designated by the phase designating memory device 16. For example, a phase of 360° is equally divided into 32 sections. Thus, suppose now that the phase designating memory device 16 designates (15), for example, the sine wave generator 18 would generate an output of cos (360°×15/32). At this time, the designated phase v(n) is expressed by v(n) = v(n−1) + C + w(n−1) where C represents the center frequency of the voltage controlled oscillator and w(n−1) represents the control signal of the voltage controlled oscillator. For example, where the control signal is always zero, as the phase designation increases the center frequency at C each interval T, the center frequency Fo is expressed by $$Fo = C/32 \cdot 1/T$$

Where the control signal w(n) of the voltage controlled oscillator is positive, the phase advances rapidly which means the oscillation frequency of the oscillator increases. Where the control voltage w(n) is negative, the reverse is true. Accordingly, in equation (1), if $\theta > 0$, as the filter 13 increases the DC component $\frac{1}{2} \sin \theta$, the control signal of the voltage controlled oscillator becomes positive so as to advance the phase of the output of the voltage controlled oscillator. If, $\theta < 0$, the reverse is true.

Figure 2:
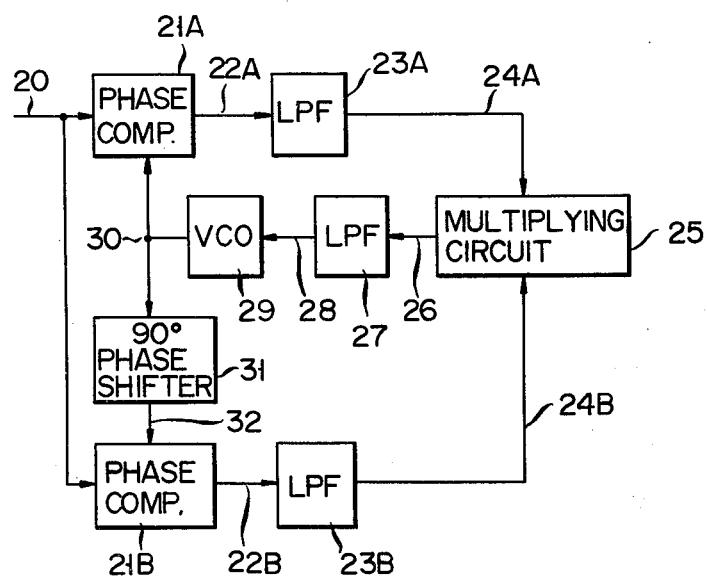
FIG. 2 is a block diagram showing the circuit construction of a Costas loop.

Among the circuits utilized to extract the carrier wave component from DSB may be mentioned a Costas loop, block diagram thereof being shown in FIG. 2.

Denoting the waveform of input 20 of DSB by A(t) cos $(\omega_c t + \theta)$ and the output 30 of a voltage controlled oscillator 29 by sin $(\omega_c t)$, the output eA(t) on line 22A of a phase comparator 21A will be expressed by the following equation $$eA(t) = A(t) \cos(\omega_c t + \theta) \sin(\omega_c t)$$

$$= \frac{1}{2} A(t) \{-\sin \theta + \sin(2\omega_c t + \theta)\} \quad (2)$$

The output 30 of the voltage controlled oscillator 29 is applied to a phase shifter 31 to produce an output $-\cos(\omega_c t)$ on output line 32. The output eB(t) of a phase comparator 21B on line 22B is expressed by the following equation $$eB(t) = -A(t) \cos(\omega_c t + \theta) \cos(\omega_c t)$$

$$= -\frac{1}{2} A(t) \{\cos \theta + \cos(2\omega_c t + \theta)\} \quad (3)$$

Low pass filters 23A and 23B are provided to cut-off a modulated component caused by a frequency $2\omega_c$ which is twice of the carrier wave frequency thereby producing the following output hA(t) and hB(t) on lines 24A and 24B, respectively.

$$hA(t) = -\frac{1}{2} A(t) \sin \theta$$

$$hB(t) = -\frac{1}{2} A(t) \cos \theta$$

These outputs are applied to a multiplying circuit 25 to obtain an output g(t) on output line 26

$$g(t) = hA(t) \cdot hB(t) = \frac{1}{4} A(t)^2 \sin \theta \cos \theta$$

$$= \frac{1}{8} A(t)^2 \sin 2\theta \quad (4)$$

Since $A(t)^2 \geq 0$, when this output of the multiplying circuit is passed through the low pass filter 27 a control signal 28 having a value proportional to sin $2\theta$ can be applied to a voltage controlled oscillator 29 thus locking the output of the voltage controlled oscillator with the input thereof. The Costas loop has a 180° ambiguity in the locked phase, however, it is also possible to digitize it in the same manner as in the phase lock loop shown in FIG. 1.

Where cos $\theta$ is selected as a sine function to be stored in the read only memory ROM, it should be remembered that there are the following relationship between trigometric functions $$\cos \theta = \cos(-\theta) = \cos(360° - \theta)$$

$$\cos \theta = -\cos 180° - \theta)$$

Thus, when these relationships are utilized, it is only necessary to store in the ROM phases within a range of from 0° to 90°.

More particularly,
when $0° \leq \theta < 90°$, read out an address corresponding to a phase $\theta$,
when $90° < \theta° 180°$, read out an address corresponding to a phase $(180° - \theta)$ and invert the sign of the output,
when $180° \leq \theta < 270°$, read out an address corresponding to a phase $(\theta - 180°)$, and invert the sign of the output,
when $270° \leq \theta < 360°$, read out an address corresponding to a phase $(360° - -\theta)$.

The addresses for reading the ROM are converted by taking into consideration the above described relationships. In the following description, it is assumed that 360° is divided into 32 equal sections, that each of 32 addresses is represented by 5 bits, and that the phase relationship between the addresses and these 5 bits can be shown by the following Table 1. In this table, the relationship between the address n and the phase is expressed by the following equation $$\theta = 360/32 \cdot n \text{ (degrees)}$$

Table 1

| address n | binary coded address | | | | | phase $\theta$ (degree) |
|---|---|---|---|---|---|---|
| 0 | 0 | 0 | 0 | 0 | 0 | 0 |
| 1 | 0 | 0 | 0 | 0 | 1 | 11.25 |
| 2 | 0 | 0 | 0 | 1 | 0 | 22.50 |
| . | | | | | | . |
| . | | | | | | . |
| . | | | | | | . |
| 7 | 0 | 0 | 1 | 1 | 1 | 78.75 |
| 8 | 0 | 1 | 0 | 0 | 0 | 90 |
| 9 | 0 | 1 | 0 | 0 | 1 | 101.25 |
| . | | | | | | . |

Table 1-continued

| address n | binary coded address | | | | | phase θ (degree) |
|---|---|---|---|---|---|---|
| . | | | | | | . |
| . | | | | | | . |
| 15 | 0 | 1 | 1 | 1 | 1 | 168.75 |
| 16 | 1 | 0 | 0 | 0 | 0 | 180 |
| 17 | 1 | 0 | 0 | 0 | 1 | 191.25 |
| . | | | | | | . |
| . | | | | | | . |
| 23 | 1 | 0 | 1 | 1 | 1 | 258.75 |
| 24 | 1 | 1 | 0 | 0 | 0 | 270 |
| 25 | 1 | 1 | 0 | 0 | 1 | 281.25 |
| . | | | | | | . |
| . | | | | | | . |
| 30 | 1 | 1 | 1 | 1 | 0 | 337.5 |
| 31 | 1 | 1 | 1 | 1 | 1 | 348.75 |

Even when the conversion is made by utilizing these relationship it is necessary to use a ROM having 9 addresses of from 0 to 8. Furthermore, when converting addresses, addresses 15, 17 and 31, for example, must refer to the first address so that the signs of the outputs from addresses 15 and 17 are inverted. Comparing binary representations of these four addresses;

| address | 1 | 00001 |
|---|---|---|
| " | 15 | 01111 |
| " | 17 | 10001 |
| " | 31 | 11111 |

When converting address 17 into address 1 the lower three bits may be the same whereas to convert addresses 15 and 31 into address 1 it is necessary to invert the lower three bits and to add +1 thereto. In order to obviate the use of nine addresses as well as the complicated conversion, it is necessary to make the relationship between the address and the phase to be that shown in the following table 2 in which the relationship between the address n and the phase θ is expressed by the following equation $$\theta = 360/32 \cdot (n+0.5) \text{ (degrees)}.$$

Table 2

| Address n | Binary coded address | | | | | Phase θ in degree |
|---|---|---|---|---|---|---|
| 0 | 0 | 0 | 0 | 0 | 0 | 5.625 |
| 1 | 0 | 0 | 0 | 0 | 1 | 16.875 |
| . | | | | | | . |
| . | | | | | | . |
| 7 | 0 | 0 | 1 | 1 | 1 | 84.375 |
| 8 | 0 | 1 | 0 | 0 | 0 | 95.625 |
| . | | | | | | . |
| . | | | | | | . |
| 14 | 0 | 1 | 1 | 1 | 0 | 163.125 |
| 15 | 0 | 1 | 1 | 1 | 1 | 174.375 |
| 16 | 1 | 0 | 0 | 0 | 0 | 185.625 |
| 17 | 1 | 0 | 0 | 0 | 1 | 196.875 |
| . | | | | | | . |
| . | | | | | | . |
| 23 | 1 | 0 | 1 | 1 | 1 | 264.375 |
| 24 | 1 | 1 | 0 | 0 | 0 | 275.625 |
| . | | | | | | . |
| . | | | | | | . |
| 30 | 1 | 1 | 1 | 1 | 0 | 243.125 |
| 31 | 1 | 1 | 1 | 1 | 1 | 354.375 |

When this relationship is used, only 8 addresses of from 0 to 7 addresses are included in the range of from 0° to 90° thus requiring a ROM including only 8 addresses, one type less than those shown in Table 1. When converting the addresses, addresses 14, 17 and 30 are converted into address 1. When binary codes of these four addresses are compared:

| Address | 1 : | 00001 |
|---|---|---|
| " | 14 : | 01110 |
| " | 17 : | 10001 |
| " | 30 : | 11110 |

More particularly, to convert address 17 into address 1 the lower three bits may be the same, whereas conversion of addresses 14 and 30 into address 1 can be performed by merely inverting lower 3 bits, so to speak, changing the least significant bit "0" to "1" and the two bits "1" next to the least significant bit to "0". However, in the case of addresses 14 and 17 it is necessary to invert the sign of the outputs.

For the reason described above, it is only necessary to provide 3 bit addresses for the ROM and to determine the sign of the outputs by using 5 bit binary coded addresses formatted as follows:

| MSB | 2nd MSB | Lower 3 bits of the address | Output |
|---|---|---|---|
| 0 | 0 | no change | positive |
| 0 | 1 | invert | negative |
| 1 | 0 | no change | nagative |
| 1 | 1 | invert | positive. |

Where MSB represents a most significant bit.

Figure 3:
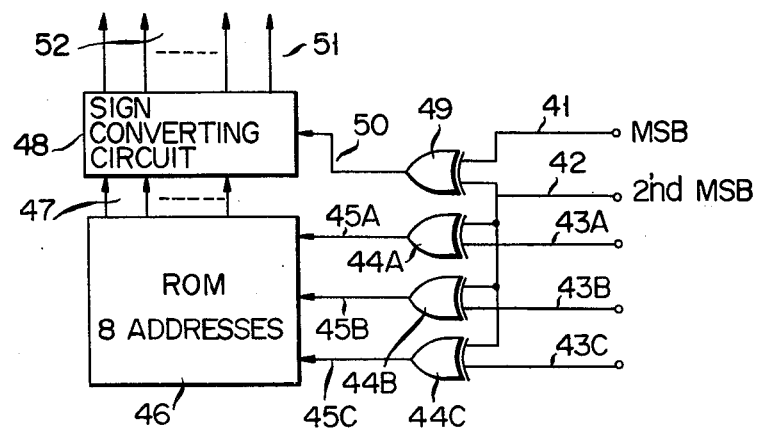
FIG. 3 is a block diagram showing the circuit construction of one embodiment of this invention.

FIG. 3 is a block diagram showing one example of the embodiment utilizing this relationship in which reference characters 41, 42, 43A, 43B and 43C designate 5 bit binary coded address signals representing phases. Of these 41 represents the most significant bit (MSB) and 42 a second MSB. According to the relationship, the lower three bits 43A, 43B and 43C, and of the second MSB are applied to the inputs of exclusive OR gate circuits 44A, 44B and 44C to obtain their logical outputs 45A, 45B and 45C which are utilized as the address bits of the ROM 46. When the output 50 of an exclusive OR gate circuit 49 supplied with the MSB and the second MSB is "1", the output of this circuit is negative, whereas when the output is "0" it is positive. Where the ROM 46 contains only positive numbers, cosine values of 0° to 90°, it is necessary to invert the sign of the outputs. To this end, a sign inverting circuit 48 is provided for the purpose of producing output waveforms 51 and 52 from the outputs 47 of the ROM 46 in which 51 represents a sign bit (MSB). Of course, the circuit construction of the sign inverting circuit 48 must be changed depending upon what type of binary codes is used to represent the value of the output waveforms.

In a sign and magnitude representing system the output 47 of the ROM 46 is produced as the output 52 of the sign inverting circuit 48 without any change and the output 50 of the exclusive OR gate circuit 49 is produced as the sign bit output 51 from the sign inverting circuit 48. In other words, in such system the sign inverting circuit 48 may be omitted. In a 2's complement representing system, in order to obtain a negative output it is necessary to invert "1" and "0" of output 47 and to add the magnitude of the least significant bit (LSB).

Figure 4:
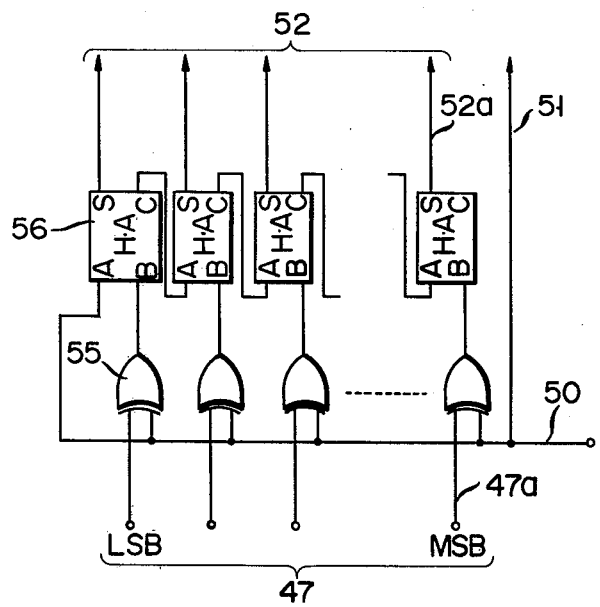
FIG. 4 is a block diagram showing the detailed construction of the sign inverting circuit utilized in the circuit shown in FIG. 3.

For this reason, the sign inverting circuit 48 is constructed as shown in FIG. 4. It comprises exclusive OR gate circuits 55 for inverting "1" and "0" and half adders 56 each producing a logical output S of inputs A and B by operating as an exclusive OR gate circuit and also producing a carry output C by operating as an AND gate circuit. When the output 50 of the exclusive OR gate circuit 49 is "1" the outputs 52 of the half adder 56 represent a negative value whereas when the output 50 is "0" the outputs 52 represent a positive value.

While the foregoing description concerns a case wherein 0° through 90° of a cosine waveform have been stored in the ROM 46, when 0° through 90° of a sine waveform are to be stored, the relationship between the addresses and the outputs of the ROM is selected as follows.

| MSB | Second MSB | Lower three bits of the address | Output |
|-----|------------|---------------------------------|--------|
| 0 | 0 | no change | positive |
| 0 | 1 | invert | positive |
| 1 | 0 | no change | negative |
| 1 | 1 | invert | negative |

To this end, the exclusive OR gate circuit 49 shown in FIG. 3 is removed and signal MSB on input 41 is directly applied to the sign inverting circuit 48.

Figure 5A:
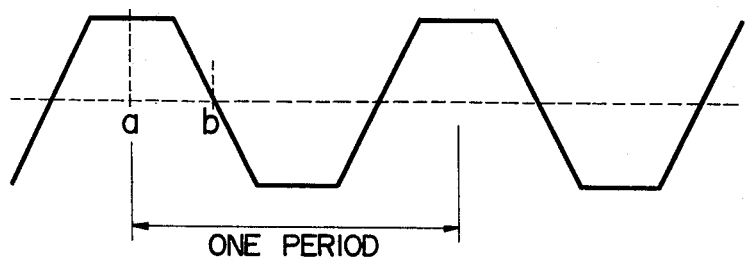
Figure 5B:
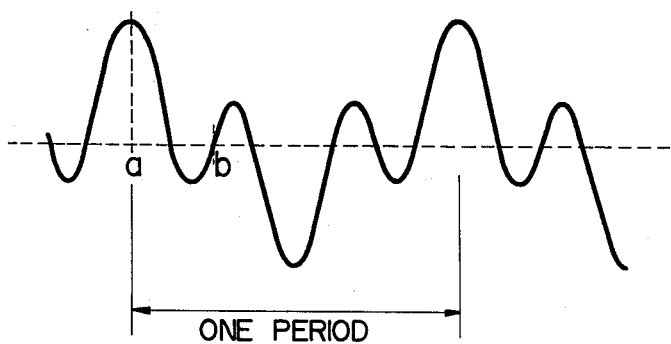

It should be understood that the method of selecting the address and inverting the sign described above is not limited to cosine and sine waveforms, and that the method is also applicable to such waveforms as those shown in FIGS. 5A and 5B. These waveforms are even symmetrical with reference to a given point a in one period and odd symmetrical with reference to a point b shifted by ¼ period from point a. This invention is also applicable to these waveforms so long as ¼ periods are stored in the ROM. Where both positive and negative values are contained in ¼ period as shown in FIG. 5B, since sign bits are also memorized in the ROM, the content of the sign inverting circuit 48 which has been described in connection with FIGS. 3 and 4 must be modified slightly. In a sign and magnitude representing system, the output signal 47 of ROM and the output 50 of the exclusive OR gate circuit 49 shown in FIG. 3 are applied to the inputs of an exclusive OR gate circuit, not shown, to form a sign bit of the output. The other bits are not required to be changed. In the case of a 2's complement representing system when the output 50 of the exclusive OR gate circuit 49 is "1", as it is necessary to multiply the output 47 of ROM 46 by $(-1)$, all bits of the output 47 of the ROM including the sign bits are inverted and then the magnitude of the least significant bit is added. For this reason, if it is assumed that input 47a (FIG. 4) represents a sign bit, the sign bit of the output is represented by 52a whereby signal 51 becomes unnecessary.

Where it is desired to form a waveform which is even symmetrical with reference to a given point a or a' in one period as shown in FIG. 6A, or odd symmetrical with reference to a given point b or b' in one period as shown in FIG. 6B the values in a ¼ period are stored in the ROM.

In these cases when one period is divided into 32 equal sections, a most significant bit of binary coded bits representing an address for designating a phase and other four bits are applied to the inputs of an exclusive OR gate circuit to form 4-bits address signal. For an even symmetrical waveform, the sign inverting circuit is not necessary. For an odd symmetrical waveform the MSB signal described above is used as a signal for controlling the sign inverting circuit. For the reason described above, for an odd symmetrical waveform, the sign inverting circuit is constructed as shown in FIG. 7.

In all cases described above, the conversion of the binary coded address signals for designating the phases into address signals of the ROM can be made easy by selecting the relationship between the phase $\theta$ and the address n to satisfy the following equation, in which it is assumed that one period is divided into N equal sections $$\theta = 360/N \, (n+0.5) \text{ degrees.}$$

Figure 8:
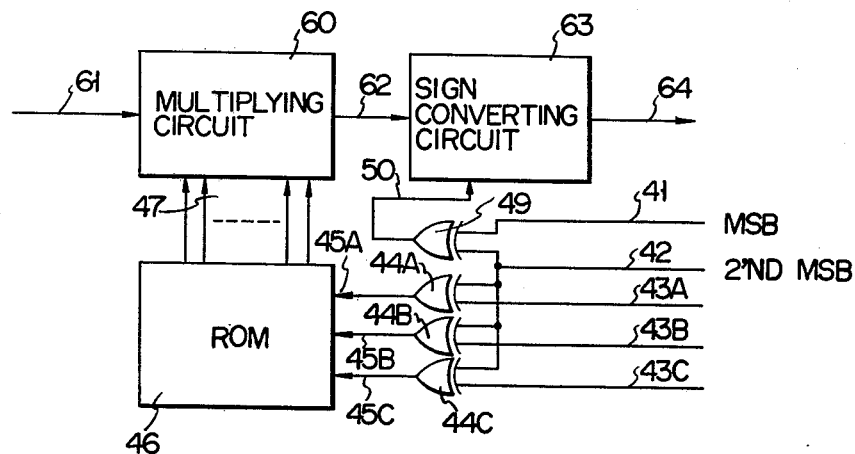
FIG. 8 is a block diagram showing still further embodiment of this invention.

In the foregoing description, the output of the ROM was directly applied to the sign inverting circuit, but it becomes unnecessary to directly invert the sign by the output of the ROM when a multiplying circuit 60 is added between the ROM 46 and the sign inverting circuit 63 as shown in FIG. 8.

More particularly, it is sufficient to invert the sign (by multiplying by $(-1)$) subsequent to the operation of the multiplying circuit 11 shown in FIG. 1. Suppose now that a five bit address information was received by the sine wave generator 18 from the phase designating memory device 16 and that the ROM containers 8 addresses of from 0 to 7 each constituted by three bits. Under these conditions, the following operation is made for the combinations of MSB and 2nd MSB of five bits supplied by the phase designating memory device 16.

| MSB | Second MSB | Lower three bits of the address | Output of multiplier |
|-----|------------|---------------------------------|----------------------|
| 0 | 0 | no change | no change |
| 0 | 1 | invert "0" and "1" | $x(-1)$ |
| 1 | 0 | no change | $x(-1)$ |
| 1 | 1 | invert "0" and "1" | no change |

FIG. 8 shows circuit elements corresponding to the sine wave generator 18 and the multiplying circuit 11 shown in FIG. 1 in which 41, 42, 43A, 43B and 43C represent the 5 bit address designating signals produced by the phase designating memory device 16 shown in FIG. 1. As above described, when the second MBS signal 42 is "1", "1" and "0" of the lower three bits of signals 43A through 43C are inverted to produce the address designating signals of the ROM 46 by means of exclusive OR gate circuits 44A, 44B and 44C. Thus, the converted address designating signals 45A, 45B and 45C are used to read the ROM. The ROM 46 is storing the values of cos $\theta$ corresponding to respective phases $\theta$ in 8 addresses in the form of 8 bits, for example, and produces on its outputs 47 the values of the addresses designated by output signals 45A, 45B and 45C of exclusive OR gate circuits 44A, 44B and 44C respectively. The contents which have been stored in the ROM 46 are all positive values so that it is not necessary to provide any sign bit. In this case, the multiplying circuit 60 functions to multiply input 61 with the outputs 47 of the ROM 46 and the output 62 of the multiplying circuit 60 represents the negative value in different manners dependent upon the form of the input 61 and the construction of the multiplying circuit. The construction of the sign inverting circuit 63 should be modified accordingly. There is provided an exclusive OR gate circuit 49 with its output 50 connected to the sign inverting circuit 63. When either one of the inputs 41 and 42 is "1" and the other is "0", the exclusive OR gate circuit 49 applies a "1" output signal 50 to the sign inverting circuit 63 whereby it multiplies input 62 with (−1) to produce an output 64. Where the negative value is to be represented in terms of its sign and magnitude, the multiplying operation of (−1) is effected to invert only the sign bit. In terms of the 1's complement all bits are inverted whereas in terms of the 2's complement it is necessary to invert all bits and to add (1) to the least significant bit (LSB). Of course, at this time, carry to the upper bit may be necessary.

Figure 9A:
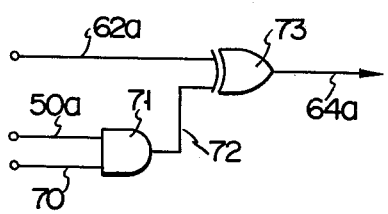
FIGS. 9A, 9B and 9C are block diagrams showing other examples of the sign inverting circuit.

FIG. 9A shows a sign inverting circuit utilized in the case of the sign and magnitude representation in which a signal 62a to one input of an exclusive OR gate circuit 73 corresponds to the output 62 of the multiplying circuit 60 shown in FIG. 8 whereas a signal 50a to one input of an AND gate circuit 71 corresponds to the output 50 of the exclusive OR gate circuit 49 shown in FIG. 8 and the output 64a of the exclusive OR gate circuit 73 corresponds to the output 64 of the sign inverting circuit 63 shown in FIG. 8. The output 72 of the AND gate circuit 71 is applied to the other input of the exclusive OR gate circuit 73, and to the other input of the AND gate circuit 71 is applied a signal 70 which becomes "1" at the timing of the sign bit. Accordingly, when the sign inverting signal 50a is "1" the AND gate circuit 71 is enabled to produce output 72 which becomes "1" at the timing of the sign bit so that the exclusive OR gate circuit 73 inverts the sign of only the sign bit signal 62a.

Figure 9B:
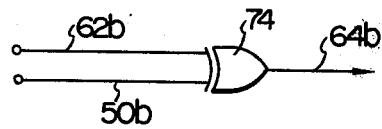

FIG. 9B shows a sign inverting circuit utilized in case of the 1's complement representation and comprises an exclusive OR gate circuit 74 having inputs connected to receive a signal 62b corresponding to the output 62 of the multiplying circuit 60 and a signal 50b corresponding to the output 50 of the exclusive OR gate circuit 49 shown in FIG. 8 thereby producing an output signal 64b corresponding to the output signal 64 of the sign inverting circuit 63 shown in FIG. 8. When the sign inverting signal 50b is "1", all bits of signal 62b are inverted by the exclusive OR gate circuit 74.

Figure 9C:
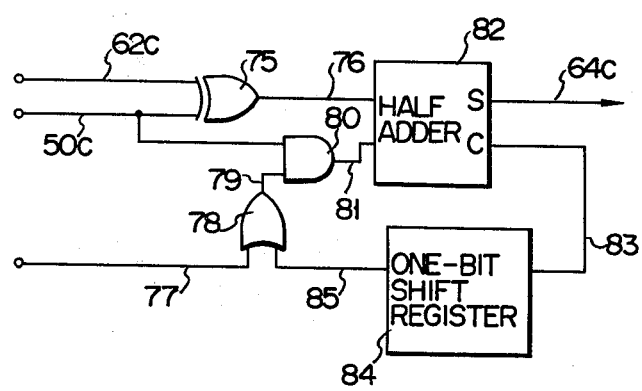

FIG. 9C shows a sign inverting circuit utilized in case of the 2's complement which comprises an exclusive OR gate circuit 75 with its inputs connected to receive a signal 62c which corresponds to the output 62 of the multiplying circuit 60 and a signal 50c corresponding to the output 50 of the exclusive OR gate circuit 49 shown in FIG. 8. An OR gate circuit 78 is provided to receive signal "1" produced at the timing of the least significant bit and the output 85 of a one-bit shift register 84. The output 79 of the OR gate circuit 78 is applied to the input of an AND gate circuit 80 together with signal 50c and the output 81 of the AND gate circuit 80 is applied to a half-adder 82 together with the output 76 of the exclusive OR gate circuit 75, thereby producing an output 64c which corresponds to the output 64 of the sign inverting circuit 63 shown in FIG. 8. When signals 50c and 77 are "1", the AND gate circuit 80 is enabled to produce "1" output 81 at the timing of the LSB. As a result of operation of the half-adder 82 when a carry signal "1" is produced on its output 83, this carry signal is delayed one bit by the one-bit shift register 83. Consequently, signal "1" appears on the output of the AND gate circuit 80 at a timing of one bit above thereby effecting a carry.

Although the sign inverting circuit shown in FIG. 9C and utilized in case of the 2's complement representation is more or less complicated, actually when the inputs 61 and 47 to the multiplying circuit 60 (FIG. 8) respectively comprise 10 bits, the output 62 of the multiplying circuit 60 would have a length of 20 bits and its least significant bit LSB would be much smaller than the quantitizing errors of the inputs 47 and 61. Often, the output 64 of the sign inverting circuit 63 is rounded-off to have 10 bits for the convenience of the succeeding mathematical operations. For this reason, although in the foregoing description, in case of the 2's complement representation, all bits were inverted and then "1" was added to the least significant bit for the purpose of multiplying (−1), this addition of "1" may be omitted without causing any serious error. Accordingly, the circuit shown in FIG. 9B can be used as the sign inverting circuit 63 for 2's complement representation.

Increase in the number of bits (which represent the respective phase values of a sine waveform) per one address of the ROM decreases the quantitizing error, but requires an increase the capacity of the ROM also complicates the multiplying circuit 11 shown in FIG. 1. Accordingly, it is not advantageous to increase the number of bits beyond a certain limit. This embodiment can not only decrease by one bit the capacity of the ROM for each address thereof but also simplify the construction of the multiplying circuit by eliminating circuit elements required to operate one bit with increasing very little quantizing error.

For example, where it is desired to limit the jitter to less than 1°, 360° is divided into 512 equal sections (where the number of division is $2^n$, addressing of the ROM becomes easy). Let us assume now that the value of $\cos\theta$ is written into the ROM by expressing the phase $\theta$ by $\theta = 360/512 \times n$ (degrees)

where n is an integer between 0 and 511. It is also possible to store only the values of n=0–128 or n=0–256 and to calculate the values of other phases based on these values of n. The number of bits to be quantized is determined by such factors as the quantizing noise. With this arrangement, however, when the quantitizing error is determined not to exceed a maximum difference between it and the value of an adjacent address, the maximum occurs between n=127 and n=128 and its value $D_{max}$ is expressed by the following equation $$D_{max} = \cos(360 \times \frac{127°}{512}) - \cos(90°) = 0.01227$$
Hence $2^{-7} < D_{max} < 2^{-6}$ When the quantizing is performed so that $D_{max}$ can be shown by with accuracy of $2^{-7}$ by rounding-off the term $2^{-8}$, the maximum value is (1) at the time when n=0. Accordingly, it is possible to reduce the number of bits to 8 by omitting a sign bit. When the sign bit is omitted, the binary codes for respective phases become as shown in the following Table 3. As can be noted from this Table, the maximum value is "100000000" and the other bits of the codes whose most significant bits are "1" are all "0". From this it will be clear that the dynamic range is not fully used.

Table 3

| n | θ (degree) | cosθ | $2^0$ | $2^{-1}$ | $2^{-2}$ | $2^{-3}$ | $2^{-4}$ | $2^{-5}$ | $2^{-6}$ | $2^{-7}$ |
|---|---|---|---|---|---|---|---|---|---|---|
| 0 | 0 | 1 | 1 | 0 | 0 | 0 | 0 | 0 | 0 | 0 |
| 1 | 0.703 | 0.9991 | 1 | 0 | 0 | 0 | 0 | 0 | 0 | 0 |
| . | . | . | | | | | | | | |
| 7 | 4.922 | 0.9963 | 1 | 0 | 0 | 0 | 0 | 0 | 0 | 0 |
| 8 | 5.625 | 0.9952 | 0 | 1 | 1 | 1 | 1 | 1 | 1 | 1 |
| . | . | . | | | | | | | | |
| 127 | 89.297 | 0.0123 | 0 | 0 | 0 | 0 | 0 | 0 | 1 | 0 |
| 128 | 90° | 0 | 0 | 0 | 0 | 0 | 0 | 0 | 0 | 0 |

Instead of storing the value of cosθ in ROM, a product of cosθ and a constant A can be stored in which case the variable is the loop gain which varies by A times. If A is approximately equal to 1, the characteristic does not vary. Accordingly, if the content A is such that the constant of the ROM wherein n=0 becomes "01111111", the most significant bits of the content of the ROM would all become "0" so that it is possible to omit the most significant bits. Moreover, since A is approximately equal to 1 the characteristic would never be affected. Thus [01111111](binary)=[0.9921875]-(decimal).

Consequently, where A=0.99 for example, the contents to be stored in the ROM would be those shown in Table 4 in which sign bits are not used. As shown in Table 4, all the most significant bits of the binary codes (under column 2°) are "0" so that it is not necessary to store them in the ROM, meaning that these most significant bits may be omitted. Of course, the operation circuits corresponding to these bits may be omitted from the multiplying circuit. The same is true when sinθ is used instead of cosθ in which case the maximum value is n=12. Furthermore, the same advantage can also be enjoyed where θ is selected as follows $$\theta = 360/512 \times (n+0.5) \text{ degrees}$$

where n is an integer of from 0 to 511. The constant A can also be selected such that the binary code becomes "01111110" when n=0 (in the case of cosθ). However, this is not more advantageous than when the constant A is selected such that the binary code becames "01111111".

Table 4

| n | θ (degree) | 0.99cosθ | $2^0$ | $2^{-1}$ | $2^{-2}$ | $2^{-3}$ | $2^{-4}$ | $2^{-5}$ | $2^{-6}$ | $2^{-7}$ |
|---|---|---|---|---|---|---|---|---|---|---|
| 0 | 0 | 0.99 | 0 | 1 | 1 | 1 | 1 | 1 | 1 | 1 |
| 1 | 0.703 | 0.9998 | 0 | 1 | 1 | 1 | 1 | 1 | 1 | 1 |
| . | . | . | | | | | | | | |
| 4 | 2.813 | 0.9888 | 0 | 1 | 1 | 1 | 1 | 1 | 1 | 1 |
| 5 | 3.516 | 0.9881 | 0 | 1 | 1 | 1 | 1 | 1 | 1 | 0 |
| . | . | . | | | | | | | | |
| 127 | 89.297 | 0.0121 | 0 | 0 | 0 | 0 | 0 | 0 | 1 | 0 |
| 128 | 90 | 0 | 0 | 0 | 0 | 0 | 0 | 0 | 0 | 0 |

With the construction described above, it is possible to decrease one bit for each address of the ROM and hence to decrease the operation circuit by one bit of the multiplying circuit following the ROM.

What we claim is:

1. A periodic function wave generator comprising means for designating a predetermined phase in one period of a periodic function signal, a circuit for producing a periodic function value of said designated phase, means for utilizing the output of said producing circuit to control said phase designating means, a memory circuit for storing the values of n phases of a periodic function obtained by equally dividing one period of said periodic function by 4N, each of said N values having a phase $\theta = 90°/n$ (i+0.5), where n represents an integer, and i represents an integer of 0 to n−1, circuit means for converting the value of an address read out of said memory circuit into one of said n phases in accordance with one of the ranges of 0°-90°, 90°-180°, 180°-270°, and 270°-360° in which said designated phase falls, and a circuit for inverting the sign of the output of said producing circuit in accordance with one of said ranges in which said designated phase falls.

2. A digital phase synchronizing circuit comprising means for designating a predetermined phase in one period of a periodic function signal, a circuit for producing a periodic function value of said designated phase, a multiplying circuit for multiplying said periodic function value with an input from outside, means for utilizing the output of said multiplying circuit to control said phase designating means, a memory circuit for storing the values of n phases of a periodic function obtained by equally dividing one period of said periodic function by 4n, each of said N values having a phase $\theta = 90°/n$ (i+0.5), where n represents an integer, and i represents an integer of 0 to n−1, circuit means for converting the value of an address read out of said memory circuit into one of said n phases in accordance with one of the ranges of 0°-90°, 90°-180°, 180°-270°, and 270°-360° in which said designated phase falls, and a circuit for inverting the sign of the output of said multiplying circuit in accordance with one of said ranges in which said designated phase falls.

3. The digital phase synchronizing circuit according to claim 2 wherein said memory circuit comprises a read only memory circuit and said sign inverting circuit is connected to the output of said multiplying circuit.

4. The digital phase synchronizing circuit according to claim 2 wherein said memory circuit comprises a read only memory circuit and said sign inverting circuit is connected between said multiplying circuit and said read only memory circuit.

5. The digital phase synchronizing circuit according to claim 2 which further comprises means for storing predetermined phase values for a ¼ period of said periodic function in said memory circuit.

6. The digital phase synchronizing circuit according to claim 2 which further comprises means for storing predetermined phase values for a ½ period of said periodic function in said memory circuit.

7. The digital phase synchronizing circuit according to claim 2 wherein said phase synchronizing circuit comprises a Costas loop.

8. The digital phase synchronizing circuit according to claim 2 wherein the contents stored in said memory circuits are said N values wherein each of said N values has been multiplied by a constant which is approximately equal to one, the value of said constant selected such that each bit of the maximum value stored in said memory circuit is a logic "one".

* * * * *